United States Patent
Hewko

[15] 3,641,842
[45] Feb. 15, 1972

[54] ROLLER TRACTION DRIVE

[72] Inventor: Lubomyr O. Hewko, Port Clinton, Ohio

[73] Assignee: General Motors Corporation, Detroit, Mich.

[22] Filed: Nov. 25, 1969

[21] Appl. No.: 879,701

[52] U.S. Cl. ..............................................74/665 K, 74/798
[51] Int. Cl. ....................................F16h 37/06, F16h 13/06
[58] Field of Search..................................74/665 K, 798, 796

[56] References Cited

UNITED STATES PATENTS

| | | | |
|---|---|---|---|
| 1,368,570 | 2/1921 | Philippeau | 74/798 |
| 2,853,899 | 9/1958 | Graham et al. | 74/796 |
| 3,252,355 | 5/1966 | Hewko | 74/796 |
| 3,304,804 | 2/1967 | Oldfield et al. | 74/665 |
| 3,475,993 | 11/1969 | Hewko | 74/798 |

*Primary Examiner*—Arthur T. McKeon
*Attorney*—Warren E. Finken, A. M. Heiter and John P. Moran

[57] ABSTRACT

A single input, contrarotating, equal speed reduction ratio, dual output roller traction drive mechanism, wherein the single input is effective from the input shaft to both the outer ring of a first friction gearing unit and split suns of a second friction gearing unit. A fixed but flexible reaction member is attached through the carrier of the second unit to split suns of the first unit. One output shaft is rotated by the carrier of the first unit, while the other output shaft is rotated by the outer ring of the second unit. Both friction gearing units include identical corresponding radii. Dual torque loader mechanisms vary internal preload in proportion to torque transmitted by causing the two outermost suns of the first and second split sun sets to move axially, with the members interconnecting the two friction gearing units and on portions of which the two sets of suns are mounted flexing in response to the axial movement of the two outermost suns to permit a corresponding axial movement of the two innermost suns.

15 Claims, 3 Drawing Figures

PATENTED FEB 15 1972

3,641,842

INVENTOR.
Lubomyr O. Hewko
BY
John P. Moran
ATTORNEY

ROLLER TRACTION DRIVE

This invention relates to friction drive mechanisms and more particularly to double-stage, split-power roller traction drive mechanisms.

In underwater vehicle applications, such as submarines and torpedo drives, as well as some surface applications, it is desirable to have one input and two contrarotating equal speed ratio propeller outputs in order to substantially eliminate the net reaction torque which tends to rotate the vehicle about its longitudinal axis. It is also desirable to have a quiet, vibration-free and efficient operation, wherein the two propellers run at a predetermined reduced speed from that of the prime mover.

Accordingly, an object of the invention is to provide an improved single input, dual contrarotating output, friction drive mechanism, wherein the outputs are both at the same reduced speed ratio.

Another object of the invention is to provide a dual friction gearing drive mechanism wherein the corresponding radii of the two units are identical.

A further object of the invention is to provide a dual friction gearing drive mechanism wherein the members interconnecting the two units are flexibly attached therebetween so as to cooperate with the torque loader mechanisms to cause the mating split sun halves of the two sets of suns to move axially toward or away from one another, as required to compensate for increased or decreased torque, respectively, without affecting the distance between the centers of the two units.

A still further object of the invention is to provide a contrarotating propeller drive mechanism wherein some particular, practical speed reduction ratio is attainable for each of the contrarotating outputs.

Still another object of the invention is to provide a friction drive mechanism which is adaptable for either ball- or roller-type intermediate members.

These and other objects and advantages of the invention will become apparent when reference is made to the following specification and accompanying drawings, wherein.

Figure 1:
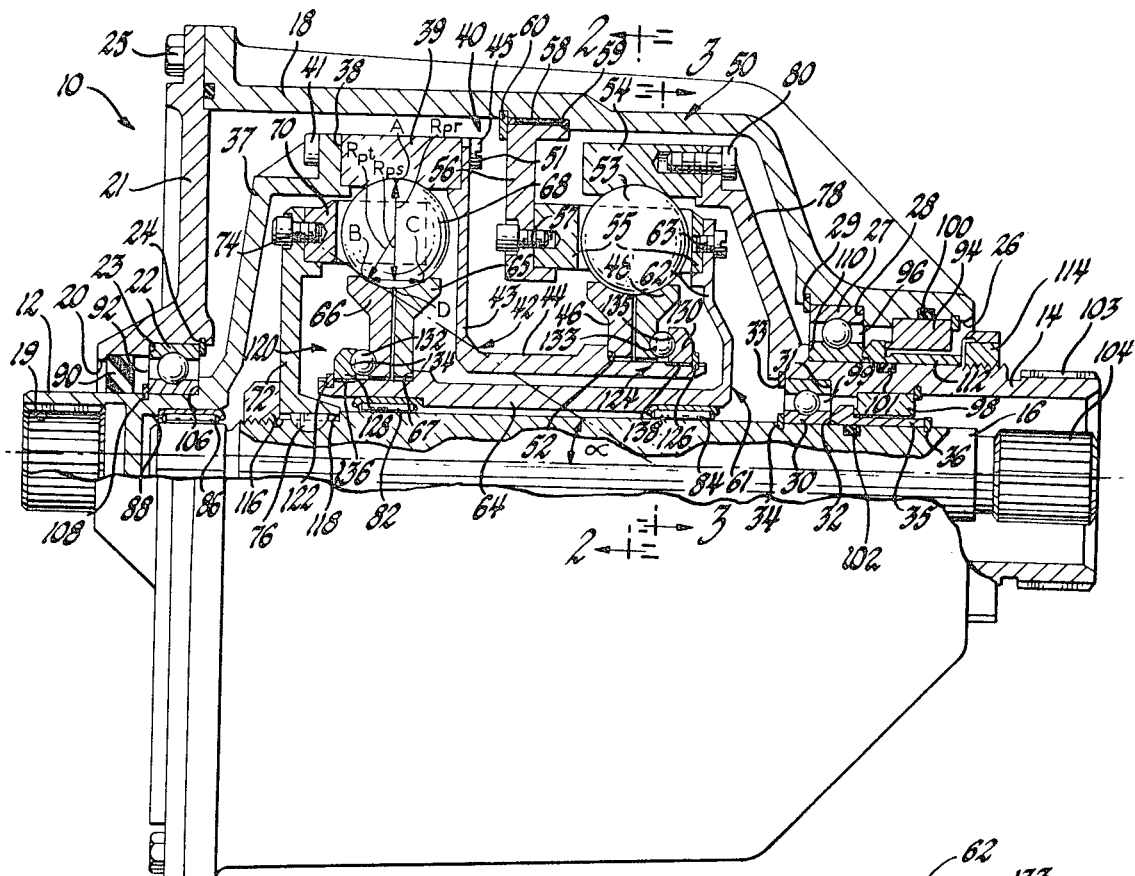
FIG. 1 is a partial cross-sectional view of a roller traction drive mechanism embodying the invention.

Referring now to the drawings in greater detail, FIG. 1 illustrates a roller traction drive mechanism 10 having a single input shaft 12 and dual contrarotating, concentric output shafts 14 and 16 mounted in a fixed housing 18. The input shaft 12 is driven by a suitable prime mover or engine (not shown) via internal splines 19, and extends into the housing 18 through an inlet opening 20 formed in an end cover 21, wherein it is supported on bearings 22. The bearings 22 are confined against axial movement by means of a shoulder 23 formed in the inlet opening 20 and a retainer ring 24 mounted on the end cover 21. The end cover 21 is secured to the housing 18 by any suitable means, such as bolts 25.

The outermost concentric output shaft 14 extends from the other end of the housing 18, through an outlet opening 26, wherein it is supported on bearings 27, the latter being confined against axial movement by means of a shoulder 28 in the outlet opening 26 and a retainer ring 29 mounted on the housing 18. The inner concentric output shaft 16 extends axially through the hollow outer output shaft 14 and is supported therein on bearings 30 mounted between the inner and outer peripheries of the outer and inner concentric shafts 14 and 16, respectively. The bearings 30 are confined against axial movement by means of shoulders 31 and 32 and retainer rings 33 and 34 on the outer and inner output shafts 14 and 16, respectively. The shoulder 32 may be the end face of a separate sleeve member 35 held in place on the inner output shaft 16 by a retainer ring 36.

A flange 37, formed on the input shaft 12 just inside the end cover 21 of the housing 18, is secured to one end 38 of a contoured ring 39 of a first friction gearing drive assembly 40 by any suitable means, such as bolt 41. An angled flex member 42 includes a flangelike axial spring portion 43 and a cylindrical extension portion 44 and is connected between the other end 45 of the contoured ring 39 and a pair of contoured suns 46 and 48 of a second friction gearing drive assembly 50. As will be explained, the flange-shaped portion 43 functions similarly to a Belleville spring and is secured adjacent the outer edge thereof to the end 45 of the ring 39 by bolts 51. The sun 46 is secured to the cylindrical member 44 adjacent a shoulder 52, while the sun 48 is slidably and rotatably mounted on the cylindrical member 44 in a manner to be described. A ball member 53 is radially located between the contoured surface portions of the pair of suns 46 and 48 and a contoured ring 54 of the second drive unit 50. A carrier 55 surrounds the ball member 53 and is secured to a reaction member 56 by bolts 57. The member 56 is secured to the housing 18 by splines 58 and restrained axially thereon by a shoulder 59 and a retainer ring 60. It should be noted at this point that the opening through the carrier 55 is large enough that any movement of the carrier 55 in an axial direction in FIG. 1 will not contact the ball member 53.

A second angled flex member 61 includes a flangelike axial spring portion 62 connected by bolts 63 to the carrier 55 and a cylindrical extension portion 64. The member 61 extends between the carrier 55 and a pair of adjacent contoured suns 65 and 66 of the first planetary unit 40. The flange-shaped portion 62, like the other flanged member 43, functions similarly to a Belleville spring, as will be seen hereinafter. The sun 65 is secured to the member 64 adjacent a shoulder 67, while the sun 66 is slidably mounted on the member 64 in a manner to be described. A second ball planet 68 is radially located between the contoured surface portions of the pair of suns 65 and 66 and the contoured ring 39 of the first planetary unit 40. A second carrier 70 surrounds the ball planet 68, and a carrier member 72 is connected by bolts 74 and key 76 between the carrier 70 and the innermost output shaft 16, respectively. The carrier 70 does not contact the ball planet 68 in an axial direction in FIG. 1. The ring 54 of the second drive unit 50 drives the outermost output shaft 14 by means of a flange member 78 formed on the shaft 14 and connected to the ring 54 by bolts 80 just inside the output end of the housing 18.

A pair of needle bearing assemblies 82 and 84 rotatably support the flex member 61 on the innermost concentric output shaft 16. Another set of needle bearings 86 rotatably supports the input end of the innermost output shaft 16 within a recess 88 formed in the input shaft 12.

A first seal ring 90 is mounted between the input shaft 12 and the inlet opening 20 in the end cover 21, adjacent the outer face 92 of the fixed bearings 22. A second seal ring 94 is mounted between the outer output shaft 14 and the outlet opening 26 in the housing 18 at the output end thereof adjacent the outer face 96 of the fixed bearings 27. A third seal ring 98 is mounted between the two output shafts 14 and 16 adjacent the outer face 99 of the bearings 30. Additional O-ring seals 100, 101 and 102 are mounted in grooves formed in the housing 18, the output shaft 14 and the output shaft 16, respectively.

Splines 103 and 104 are formed on the output ends of the shafts 14 and 16 for connection with suitable members to be driven, such as a pair of propellers (not shown).

The input shaft 12 is held against axial movement by a shoulder 106 and a retainer ring 108 abutting against the end faces of the fixed bearings 22. The outermost output shaft 14 is held against axial movement by a shoulder 110 and a sleeve member 112 adjacent the end faces of the fixed bearings 27. The sleeve member 112 is held against the face 96 of the fixed bearings 27 by a nut 114 threadedly mounted on the outer output shaft 14 inwardly of the splines 103.

The inner output shaft 16 is held against axial movement by the retainer ring 34 and the sleeve member 35 adjacent the end faces of the bearings 30, previously described as being fixed on the inside surface of the hollow output shaft 14 by the shoulder 31 and the retainer ring 33. A nut 116 is threadedly mounted adjacent the inner end of the innermost output shaft 16 and abutted against the carrier member 72 to hold the latter against a shoulder 118 formed on the inner shaft 16, thereby positioning the carrier 70 relative to the ball planet 68.

Figure 3:
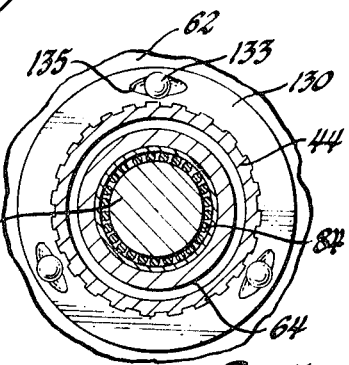
FIG. 3 is a cross-sectional view taken along the plane of line 3—3 of FIG. 1, as if FIG. 1 were a full round view, and looking in the direction of the arrows.

A first torque loader mechanism 120 is mounted on the forward end of the flex member 61 between the sun 66 of the first planetary unit 40 and a retainer ring 122 mounted on the end of the cylindrical portion 64 of the flex member 61. A second torque loader mechanism 124 is mounted on the rearward end of the flex member 42 between the sun 48 of the second drive unit 50 and a retainer ring 126 mounted on the end of the cylindrical portion 44 of the flex member 42. The torque loaders 120 and 124 include similar ball ramp members 128 and 130 and balls 132 and 133, respectively. The balls 132 and 133 are confined between irregular ramp surfaces 134 and 135 (FIG. 3) formed on the ball ramp members 128 and 130 and the adjacent suns 66 and 48, respectively, and the ramp members 128 and 130 are secured by respective splines 136 and 138 to the flex members 61 and 42. The mechanisms 120 and 124 are similar to the spaced torque-sensing ball ramp devices described in U.S. Pat. No. 3,283,614, issued on Nov. 8, 1966 in the name of the Applicant, except that the devices in the patent function on opposing sides of adjacent axially movable split suns, rather than on the outermost halves of two sets of split suns, each set of which includes one fixed sun and one axially slidable sun.

Figure 2:
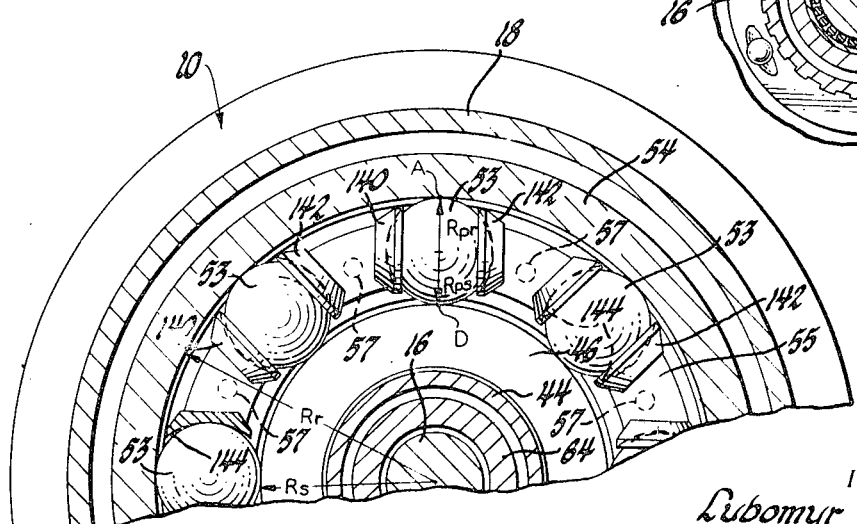
FIG. 2 is a fragmentary cross-sectional view taken along the plane of line 2—2 of FIG. 1, as if FIG. 1 were a full round view, and looking in the direction of the arrows.

Referring now to FIG. 2, it may be noted that there are eight ball members 53 and 68 in each of the drive units 40 and 50. Torque forces are transmitted between the balls 53 and 68 and their respective carriers 55 and 70 through partial spherical, hydrodynamic journal bearing surfaces created between the ball members and oppositely disposed cuplike slidable inserts 140 and 142, by virtue of the spherical surfaces 144 of the inserts 140 and 142 having a slightly larger radius than that of the balls 53 and 68, providing a wedged opening therebetween, whereby lubricant in the wedged opening can lift the ball members 53 and 68 for full hydrodynamic spherical bearing lubrication. The inserts 140 and 142 are thus effectively confined between opposite sides of the balls 53 and 68 and their respective surrounding carriers 55 and 70. In other words, while there is no contact between the ball members 53 and 68 and their adjacent carriers 55 and 70, respectively, in the axial direction (FIG. 1), there is a direct connection between the ball members 53 and 68 and the carriers 55 and 70 in the plane of FIG. 2 through the intermediate inserts 140 and 142.

OPERATION

Assume now that the input shaft 12 is being rotated clockwise as viewed from the left in FIG. 1 by any suitable prime mover (not shown). The ring 39 of the first planetary unit 40 will likewise be rotated clockwise by interconnecting flange 37. Nonslipping frictional engagement between the ring 39 and the planet balls 68 will rotate the latter in a clockwise direction about the suns 65 and 66. The sun 65 and the ramp member 128 are held against the rotation by virtue of both being directly connected to the fixed cylindrical member 64, the sun 66 being slidably and rotatably mounted on the member 64. The balls 132 and the ramp member 128 urge the sun member 66 to rotate and move axially on the member 64, as required to accommodate relative ramp displacement due to torque forces. The member 64, of course, is held against rotation by the carrier 55 and the reaction member 56, the latter being secured to the housing 18 by the splines 58.

The carrier 70 of the first planetary unit 40 is thus caused to rotate in a clockwise direction. Since the carrier 70 is secured to the innermost output shaft 16 by the key 76, the shaft 16 will, likewise, be rotated in a clockwise direction.

As previously described, the ring 39 of the first planetary unit 40 is connected by the flex member 42 to the suns 46 and 48 of the second drive unit 50, causing the suns 46 and 48 to rotate in a clockwise direction with the ring 39. This will cause the ball members 53 to rotate in place within the bearing inserts 140 and 142 in a counterclockwise direction, inasmuch as they are restrained from rotation about the axis of the housing 18 by the fixed carrier 55 and the fixed reaction member 56. The counterclockwise spinning rotation of the ball members 53 will cause the ring 54 to rotate in a counterclockwise direction, and the ring, in turn, via the flange 78, will rotate the outermost output shaft 14 in a counterclockwise direction, or in a direction opposite to that of the other concentric output shaft 16.

At this point it should be noted that throughout the above-described operation, the axial centers of the drive assemblies 40 and 50 remain in a fixed distance apart at all times. However, as torque increases, for example, the sun halves 46/48 and 65/66 all approach their respective mating halves. This axial movement of the individual split suns is accomplished by virtue of the balls 132 and 133 moving under the increased torque in a direction which both moves the outermost sun halves 48 and 66 toward their mating sun halves 65 and 46, respectively, and urges the ramp members 128 and 130 outwardly away from their respective adjacent sun halves 66 and 48. This outward pressure on the ramp members 128 and 130 is transferred through the retainer rings 122 and 126 to the cylindrical members 64 and 44 and thence to the flexible flange members 62 and 43, respectively. Movement of the flexible flange members 62 and 43 is in a direction which, by virtue of the shoulders 67 and 52, causes the other sun halves 65 and 46 to move their respective mating sun halves 66 and 48 the same distance as the above-described axial movement of the latter.

It should be further noted at this point that the spring rate of the Belleville-springlike flange members 43 and 62 must be compatible with the torque loader 120 and 124 characteristics. To effect a desired relationship, the thicknesses of the flange members 43 and 62 may be correspondingly varied throughout the radial spans thereof, such as by tapering, dishing, and or contouring their respective cross sections.

With the two drive units 40 and 50 interconnected in the above-described manner such that for one input there are two opposite rotational outputs, it will now be shown that the speed ratios of both outputs are identical.

As illustrated in FIG. 2, let:

$R_s$ = sun radius  $\quad$ $R_r$ = ring radius
$R_{ps}$ = planet-sun radius  $\quad$ $R_{pr}$ = planet-ring radius
$N_s$ = sun r.p.m.  $\quad$ $N_c$ = carrier r.p.m.
$N_r$ = ring r.p.m.  $\quad$ $N_p$ = planet r.p.m.
$R$ = speed reduction ratio of the respective rotating drive unit elements, i.e., $N_r/N_c$ for unit 40 and $N_s/N_c$ for unit 50.

Additionally, let the radii of corresponding components of the two drive units be equal.

Then for any traction drive, one can write the following kinematic relationship:

$$N_c(R_r R_{ps} + R_s R_{pr}) = N_r R_r R_{ps} + N_s R_s R_{pr} \quad (1)$$

Now, let subscript 1 denote the first planetary unit 40, and subscript 2 denote the second drive unit 50. $N_{s1}=0$, by virtue of the suns 65 and 66 being fixed through the members 61, 55 and 56 to the housing 18. Hence, we can see from equation (1) that:

$$N_{c1}(R_r R_{ps} + R_s R_{pr}) = N_{r1} R_r R_{ps} + 0$$

(Subscripts 1 and 2 can be omitted from the radii, since corresponding radii of the two drive units are equal.)

The speed reduction ratio of the first unit, therefore, becomes:

$$R_1 = \frac{N_{r1}}{N_{c1}} = \frac{R_r R_{ps} + R_s R_{pr}}{R_r R_{ps}} = 1 + \frac{R_s R_{pr}}{R_r R_{ps}}$$

or, for $N_{s1} = 0$:

$$R_1 = \frac{N_{r1}}{N_{c1}} = 1 + \frac{R_s R_{pr}}{R_r R_{ps}} \quad (2)$$

Similarly, since $N_{c2}=0$, equation (1) becomes:
$$0 = N_{r2}R_r R_{ps} + N_{s2}R_s R_{pr}$$
and the speed reduction ratio of the second unit becomes:

$$R_2 = \frac{N_{s2}}{N_{r2}} = -\frac{R_r R_{ps}}{R_s R_{pr}} \quad (3)$$

For contrarotation the speed reduction ratios of both units must be the same in absolute value but opposite in sign. Therefore:

$$|R_1| = |-R_2| \quad (4)$$

The value of the ratio can be computed by equating equation (2) to equation (3). But first, substituting in the two expressions:

$$R_s/R_r \times R_{pr}/R_{ps} = K \quad (5)$$

Then, the equations (2) and (3) can be rewritten as:

$$R_1 = N_{r1}/N_{c1} = 1 + K \quad (6)$$

and $$R_2 = N_{s2}/N_{r2} = -1/K \quad (7)$$

Further, since there are one input and two outputs, and in view of the above-described interconnections:

$$\left. \begin{array}{ll} N_{r1} = N_{s2} = N_{in} & \text{(input)} \\ N_{c1} = N_{out(1)} & \text{(first output)} \\ N_{r2} = N_{out(2)} & \text{(second output)} \end{array} \right\} \quad (8)$$

Now, solving equation (4) by using equations (6) and (7):

$$|1 + K| = \left|\frac{-1}{K}\right| \quad (9)$$

It is obvious from equation (5) that $K$ must always be positive, negative radii being meaningless in equation (1). Therefore, (9) can be rewritten, for $K \geq 0$, as:

$$1 + K = 1/K \quad (10)$$

transposing,
$$K^2 + K - 1 = 0$$

Solving for $K$, we get:

$$K = \frac{-1 \pm \sqrt{1+4}}{2} = \frac{-1 \pm \sqrt{5}}{2}$$

$$K_1 = \frac{-1 + \sqrt{5}}{2}$$

is a good solution for $K$ \quad (11)

$$K_2 = \frac{-1 - \sqrt{5}}{2}$$

leads to $K<0$, thus violating restriction $K \geq 0$, and is disregarded.

Proceed now to calculate the speed reduction ratio which satisfies the contrarotating outputs with two similar drive units. Substituting equation (11) in equation (6):

$$R_1 = 1 + \frac{-1 + \sqrt{5}}{2} = \frac{1 + \sqrt{5}}{2} = \frac{1 + 2.235}{2} \cong 1.618$$

Similarly, substituting equation (11) in equation (7):

$$R_2 = \frac{-1}{\frac{-1 + \sqrt{5}}{2}} = \frac{-2}{-1 + \sqrt{5}} = \frac{-2}{1.235} \cong -1.618$$

It is apparent that there is one common ratio, namely, 1.618, which can be obtained from a particular geometric relationship of friction gearing drive components. As determined above, this geometric relationship may be defined as:

$$\frac{R_s}{R_r} \times \frac{R_{pr}}{R_{ps}} = \frac{-1 + \sqrt{5}}{2} \quad (12)$$

For a simple drive mechanism, $R_{pr}=R_{ps}$; therefore, $R_{pr} R_{ps}=1$, and the simplified geometric drive relationship is:

$$\frac{R_s}{R_r} = \frac{-1 + \sqrt{5}}{2} \quad (13)$$

While the above description and calculations relate to identical corresponding friction gearing radii in dual units, in an application wherein it is required that the outputs from the dual units be different, such as where some accessory device is to be actuated by one of the two output shafts, or for any other reason, it is merely necessary to change the sun radius to ring radius ratios of the two units as required.

Now, in those applications wherein $R_{pr}$ does not equal $R_{ps}$, such as could be the case if the points of contact between the ball planet and its associated ring and split suns were substantially different as represented by points "A," "B" and "C" of planetary unit 40 (FIG. 1), rather than points "A" and "D," causing the radial distance from the center of the ball planet 68 to a line connecting points "B" and "C" to be shorter than the radial distance from the center of the ball planet 68 to the point "D" the following relationship would be applicable:

As illustrated in FIG. 1, let $R_{pt}$ equal the distance between the center of the planet and the point of contact with either split sun, and let $\alpha$ equal the angle subtended by the intersection of the tangent through point "B" and the axis of the drive unit. Then:

$$R_{ps} = R_{pr} - R_{pt}(1 - \cos\alpha) \quad (14)$$

When the intermediate member is a ball, $R_{pt}=R_{pr}$. Therefore:
$$R_{ps} = R_{pr} - R_{pr}(1 - \cos\alpha)$$

or $$R_{ps} = R_{pr}\cos\alpha \quad (15)$$

and, applying equation (15) to equation (12):

$$\frac{R_s}{R_r} \times \frac{1}{\cos\alpha} = \frac{-1 + \sqrt{5}}{2} \quad (16)$$

Now, should the planet be a barrel roller, such as described in the above-mentioned U.S. Pat. No. 3,283,614, which is not a portion of a sphere, applying equation (14) to equation (12):

$$\frac{R_s}{R_r} \times \frac{R_{pr}}{R_{pr} - R_{pt}(1 - \cos\alpha)} = \frac{-1 + \sqrt{5}}{2} \quad (17)$$

It should be noted that the above-described controlled common speed ratio will also be attainable for a traction drive mechanism 10 wherein the reaction member 56 is secured to the housing 18 by being axially slidably mounted on the splines 58. In this event, the flange portion 62 may be rigid, with the above-described axial movement of the member 64 being possible as a result of the sliding action of the member 64 along the splines 58 while serving as the reaction means. Furthermore, the output flange member 78 may be the flexible member, while the flange portion 43 may be a rigid member, in which case, under increased torque, the torque loader ball 133 will move the sun half 48 toward the stationary sun half 46, thereby moving the ball 53 of the second friction gearing unit to the left in FIG. 1. Such action will move the second unit ring 54 to the left, keeping the sun and ring centers aligned and flexing the flange member 78.

In summary, it is evident that the invention provides a contrarotating traction drive mechanism that is economical and readily manufacturable in that friction gearing elements having substantially identical radii are employed in the dual drive units.

It is further evident that the invention provides an improved structural arrangement wherein a controlled common speed ratio is readily attainable for the dual contrarotating outputs.

It is still further evident that the invention is adaptable to roller, ball and gear drive arrangements.

While basic embodiments of the invention have been shown and described, other modifications thereof are possible.

I claim:

1. A friction drive mechanism comprising a housing, a power input shaft rotatably supported in said housing, first and second contrarotating power output shafts, a first planetary speed reducing unit operatively connected between said input shaft and said first output shaft, a second speed reducing unit operatively connected between said first planetary unit and said second output shaft, and at least one flexible torque-responsive member operatively connected among said first and second speed-reducing units and said power input and power output shafts.

2. A friction drive mechanism comprising a housing, a power input shaft rotatably supported in said housing, first and second contrarotating power output shafts, a first friction gearing unit operatively connected between said input shaft and said first output shaft, a second friction gearing unit operatively connected between said first friction gearing unit and said second output shaft, a pair of flexible members interconnecting portions of said first and second friction gearing units, and means operatively connected to said pair of flexible members for causing said pair of flexible members to flex in response to the torque applied to said first and second units.

3. The friction drive mechanism described in claim 2, wherein said first friction gearing unit includes first, second and third planetary members, and said second friction gearing unit includes fourth, fifth and sixth members, one of said pair of flexible members being connected between said first and said sixth members, and the other of said pair of flexible members being connected between said third and fifth members.

4. The friction drive mechanism described in claim 3, wherein said means for causing said flexible members to flex is operatively connected to said third and sixth members.

5. The friction drive mechanism described in claim 4, wherein said third and sixth members are first and second sets of split suns, respectively, one-half of each set of which is slidably mounted on the respective flexible members adjacent said means for causing said pair of flexible members to flex, and the other half of each set of which is secured to said respective flexible members adjacent said one-half of each set.

6. A friction drive mechanism comprising a housing, a power input shaft rotatably supported in said housing, first and second contrarotating power output shafts, a first planetary speed reducing unit including input, output and fixed members and operatively connected between said input shaft and said first output shaft, a second speed reducing unit including input, output and fixed members and operatively connected between said first planetary unit and said second output shaft, a first flexible torque-responsive member interconnecting the input members of said first and second speed reducing units, and a second flexible torque-responsive member interconnecting the fixed members of said first and second units.

7. A friction drive mechanism comprising a housing, a power input shaft rotatably supported in said housing, first and second contrarotating power output shafts, a first planetary speed reducing unit including a first input member, a first output member and a first fixed member, a second speed reducing unit including a second input member, a second output member and a second fixed member, means for connecting said first input member to said input shaft for rotation therewith, means for driving said second input member from said first input member, reaction means connected between said housing and said second fixed member, means for connecting said first fixed member to said second fixed member, means for connecting said first power output shaft to said first output member for rotation therewith, and means for connecting said second power output shaft to said second output member for rotation therewith.

8. A friction drive mechanism comprising a housing, a power input shaft rotatably supported in said housing, first and second contrarotating power output shafts, a first planetary speed reducing unit including a first ring, a first sun, a first planet frictionally engaging said first ring and said first sun, a first carrier operatively connected to said first planet, a second speed reducing unit including a second ring, a second sun, a second member frictionally engaging said second ring and said second sun, a second carrier operatively connected to said second member, first means for connecting said first ring to said input shaft for rotation therewith, second means for connecting said second sun to said first ring for rotation therewith, reaction means connected between said housing and said second carrier, third means for connecting said first sun to said second carrier, fourth means for connecting said first power output shaft to said first carrier for rotation therewith, and means for connecting said second power output shaft to said second ring for rotation therewith.

9. The friction drive mechanism described in claim 8, wherein said first sun includes first and second split sun halves, and said second sun includes third and fourth split sun halves, and a first torque-loading unit mounted on said third means for connecting said first sun to said second carrier adjacent said first sun half for slidably moving said first sun half in response to applied torque, a second torque-loading unit mounted on said second means for connecting said second sun to said first ring adjacent said fourth sun half for slidably moving said fourth sun half in response to applied torque.

10. The friction drive mechanism described in claim 9, wherein each of said means for connecting said first sun to said second carrier and said means for connecting said second sun to said first ring includes flexible means for causing said second and third sun halves, respectively, to move axially a distance corresponding to that of the slidably moving first and fourth sun halves, respectively, and in the direction opposite thereto.

11. The friction drive mechanism described in claim 8, wherein said second means includes a first cylindrical member having a first collar formed on one end thereof, said second sun being mounted on the other end thereof, and said first collar being secured adjacent the outer edge thereof to said first ring; and said third means includes a second cylindrical member having a second collar formed on one end thereof, said first sun being mounted on the other end thereof, and said second collar being secured adjacent the outer edge thereof to said second carrier; and bearing means mounted between the outer surface of said first power output shaft and the inner surface of said second cylindrical member.

12. A friction drive mechanism comprising a housing, a power input shaft rotatably supported in said housing, first and second contrarotating power output shafts, a first friction gearing unit including a first ring, a first sun, a first intermediate member frictionally engaging said first ring and said first sun, a first carrier operatively connected to said first intermediate member, a second friction gearing unit including a second ring, a second sun, a second intermediate member frictionally engaging said second ring and said second sun, a second carrier operatively connected to said second intermediate member, a first flange means connecting said first ring to said power input shaft for rotation therewith, first flexible connector means interconnecting said first ring and second sun for adjusting said second sun in response to torque changes, reaction means mounted on said housing and supporting said second carrier, second flexible connector means interconnecting said second carrier and said first sun for adjusting said first sun in response to said torque changes, rigid connector means for connecting said first power output shaft to said first carrier for rotation therewith, and second flange means connecting said second power output shaft to said second ring for rotation therewith.

13. A friction drive mechanism comprising a housing, a power input shaft rotatably supported in said housing, first and second contrarotating power output shafts, a first planetary speed reducing unit including a first ring, a first set of split suns, a first planet frictionally engaging said first ring and said first set of split suns, a first carrier operatively connected to said first planet, a second speed reducing unit including a second ring, a second set of split suns, a second member frictionally engaging said second ring and said second set of split suns, a second carrier operatively connected to said second member, first flange means for connecting said first ring to said input shaft for rotation therewith, first flexible means for connecting said second set of split suns to said first ring for rotation therewith, one of said second set of split suns being slidably mounted on said first flexible means and the other of said second set of split suns being fixed thereon, fixed reaction means secured to said housing and supporting said second carrier, second flexible means for connecting said first set of split suns to said second carrier, one of said first set of split suns being slidably mounted on said second flexible means and the other of said first set of split suns being fixed thereon, second flange means for connecting said first power output shaft to said first carrier for rotation therewith, third flange means for connecting said second power output shift to said second ring for rotation therewith, a first torque-loading device mounted on said first flexible means for slidably moving said one of said second set of split suns in response to torque transmitted thereto and thereby causing said first flexible means to flex an amount sufficient to move the other of said second set of split suns through a distance corresponding to the movement of said one of said second set of split suns, and a second torque-loading device mounted on said second flexible means for slidably moving said one of said first set of split suns in response to torque transmitted thereto and thereby causing said second flexible means to flex an amount sufficient to move the other of said first set of split suns through a distance corresponding to the movement of said one of said first set of split suns, with the distance between the centers of said first and second speed reducing units remaining fixed.

14. A friction drive mechanism comprising a housing, a power input shaft rotatably supported in said housing, first and second contrarotating power output shafts, a first planetary speed-reducing unit including a first ring, a first sun, a first planet frictionally engaging said first ring and said first sun, a first carrier operatively connected to said first planet, a second speed-reducing unit including a second ring, a second sun, a second member frictionally engaging said second ring and said second sun, a second carrier operatively connected to said second member, a first flange means connecting said first ring to said power input shaft for rotation therewith, flexible connector means interconnecting said first ring and said second sun for adjusting said second sun in response to torque changes, slidable reaction means mounted on said housing and supporting said second carrier, rigid connector means interconnecting said second carrier and said first sun for adjusting said first sun in response to said torque changes, rigid connector means for connecting said first power output shaft to said first carrier for rotation therewith, and second flange means connecting said second power output shaft to said second ring for rotation therewith.

15. A friction drive mechanism comprising a housing, a power input shaft rotatably supported in said housing, first and second contrarotating power output shafts, a first planetary speed reducing unit including a first ring, a first sun, a first planet frictionally engaging said first ring and said first sun, a first carrier operatively connected to said first planet, a second speed reducing unit including a second ring, a second sun, a second member frictionally engaging said second ring and said second sun, a second carrier operatively connected to said second member, rigid flange means connecting said first ring to said power input shaft for rotation therewith, rigid connector means interconnecting said first ring and said second sun for adjusting said second sun in response to torque changes, reaction means mounted on said housing and supporting said second carrier, flexible connector means interconnnecting said second carrier and said first sun for adjusting said first sun in response to said torque changes, rigid connector means for connecting said first power output shaft to said first carrier for rotation therewith, and flexible flange means connecting said second power output shaft to said second ring for rotation therewith.

* * * * *